United States Patent Office 2,855,689
Patented Oct. 14, 1958

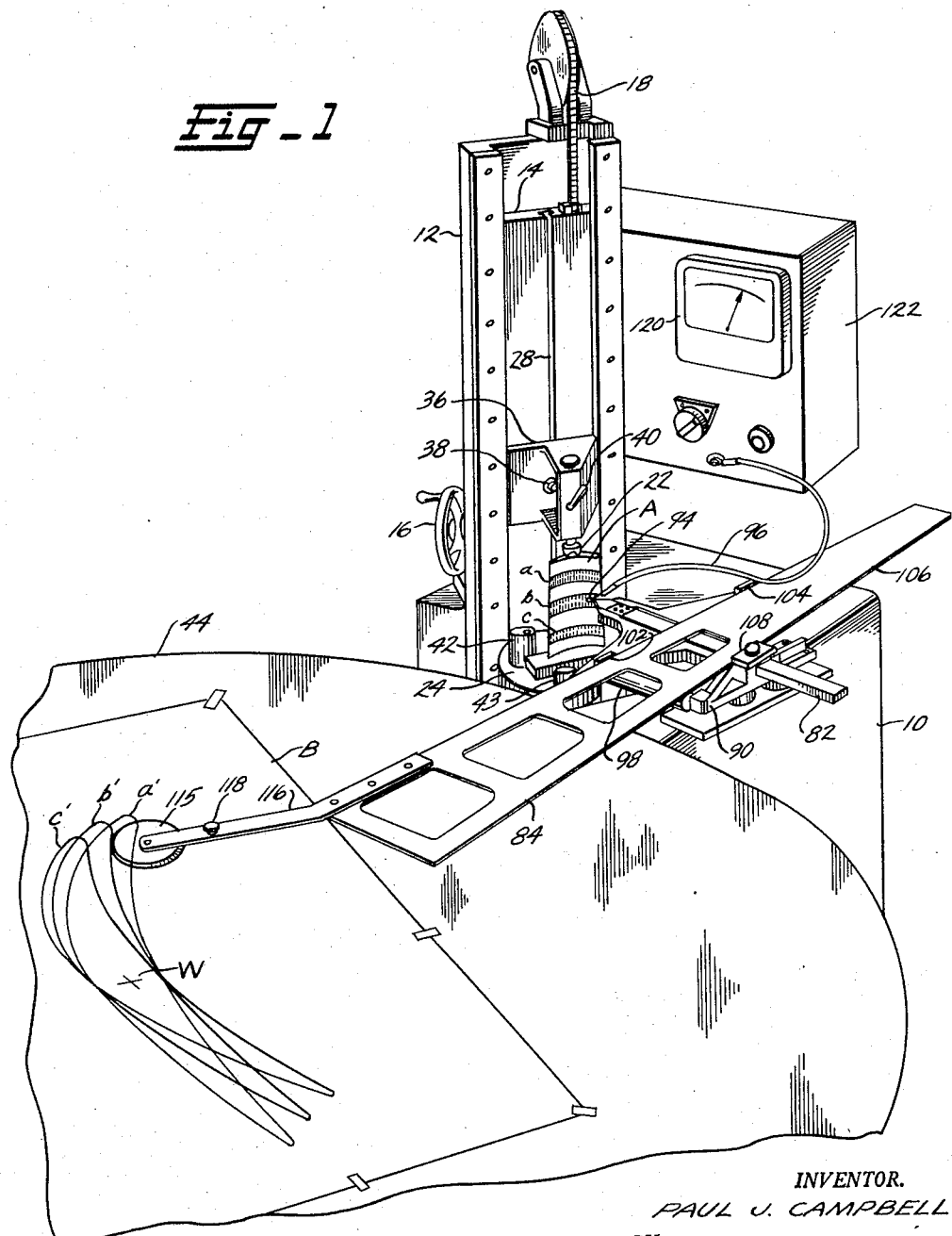

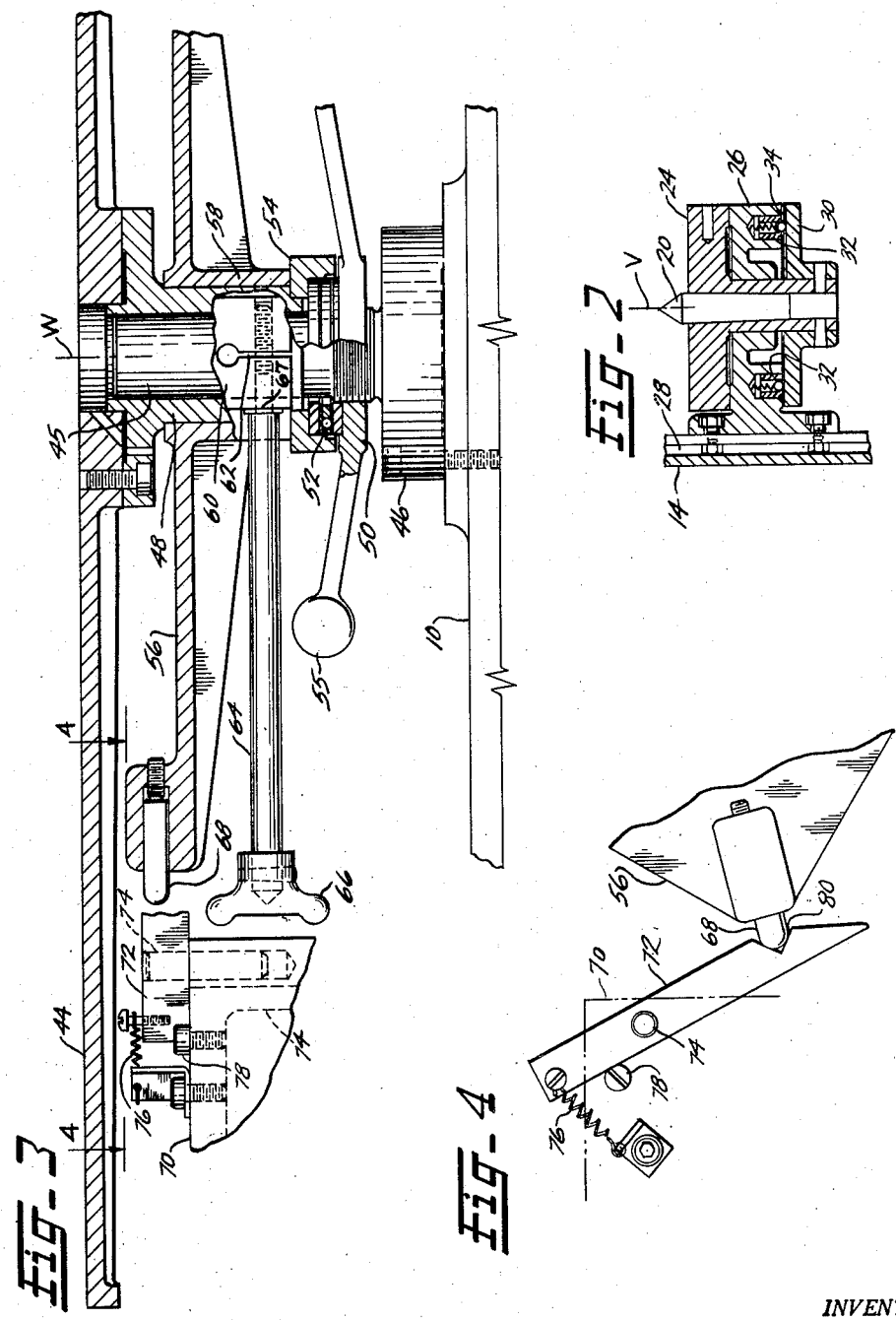

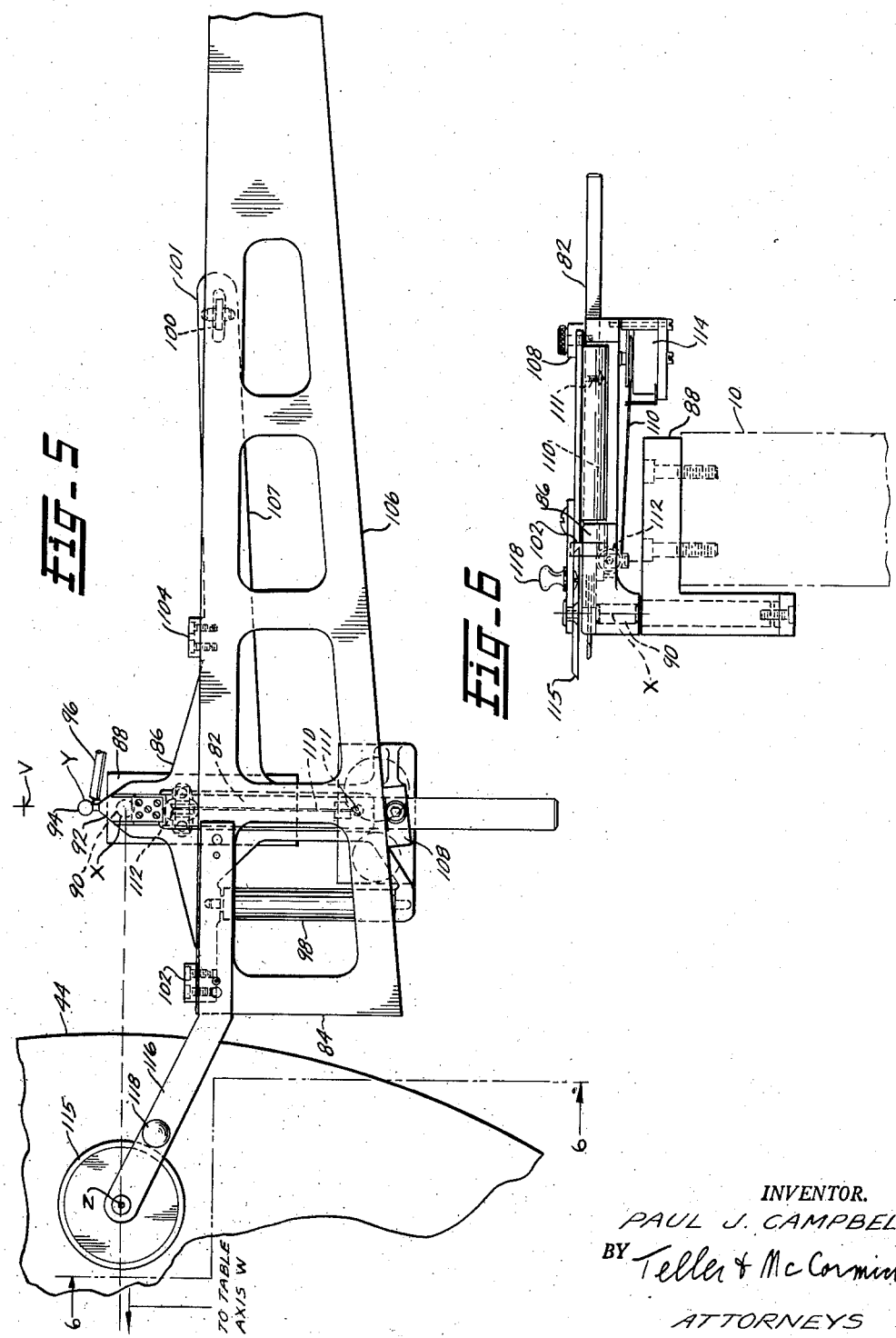

2,855,689

APPARATUS FOR INSPECTING A WORKPIECE CONTOUR

Paul J. Campbell, Moodus, Conn., assignor to The New England Machine and Tool Company, Berlin, Conn., a corporation of Connecticut Application October 11, 1955, Serial No. 539,869

6 Claims. (Cl. 33—174)

The invention relates to an apparatus for inspecting the contour of a workpiece. Stated more specifically, the invention relates to an apparatus for comparing the contour of a workpiece at a selected plane thereof with a master contour to determine deviations of said workpiece contour from a standard contour therefor at said plane.

An apparatus embodying the invention is in some respects similar to that shown in Figs. 28 to 31 of my Patent No. 2,677,310 dated May 4, 1954 and entitled, Contour Forming Machine Including Tracer Control Mechanism.

The general object of the invention is to provide an apparatus for the stated purpose which is simple and inexpensive and conveniently adaptable for inspecting any of a wide variety of workpieces.

Other and more specific objects of the invention will be apparent from the drawings and from the following description and claims.

In the drawings I have shown in detail a preferred embodiment of the invention, but it will be understood that various changes may be made from the construction shown, and that the drawings are not to be construed as defining or limiting the scope of the invention, the claims forming a part of this specification being relied upon for that purpose.

Of the drawings:

Fig. 1 is a perspective view of an apparatus embodying the invention.

Fig. 2 is a fragmentary vertical sectional view taken through the center of the rotary support for the workpiece to be inspected.

Fig. 3 is a fragmentary vertical sectional view through the center of the rotary table of the apparatus.

Fig. 4 is a fragmentary plan view taken in the direction of the arrows 4, 4 in Fig. 3.

Fig. 5 is a plan view of certain parts of the apparatus.

Fig. 6 is a left end view taken in the direction of the arows 6, 6 in Fig. 5, but omitting the rotary table.

An apparatus conforming to the invention may be of general utility and may be adapted for the inspection of parts having widely differing contours. However, in order that one embodiment of the invention may be clearly understood, an apparatus is shown in the drawings and will be described in detail which is particularly adapted for the inspection of workpieces that were machined on centers and which can therefore be held on centers for inspection purposes. A turbine blade such as shown at A in Fig. 1 can be taken as an example of such a workpiece. For a turbine blade the contour must be checked or inspected at one or more planes or zones perpendicular to the axis through said centers. In the operation of the apparatus the workpiece A is mounted in vertical position so that said zones or planes of inspection are horizontal. The contours of the workpiece at different levels or planes $a$, $b$ and $c$ are compared with much larger horizontal master contours $a'$, $b'$, and $c'$ on a reference sheet B. Except for size, the reference contours $a'$, $b'$ and $c'$ are the same as the desired or standard contours of the workpiece at the planes $a$, $b$ and $c$. The size ratio between the reference contours and the workpiece contours will be referred to as the predetermined ratio. This ratio may be widely varied, but as illustrated it is 10 to 1.

It will be assumed that the workpiece has a twist and that the contours of said workpiece at said predetermined planes $a$, $b$ and $c$ have an angular relationship that is the same as the angular relationship of the contours $a'$, $b'$, and $c'$ on said reference sheet B.

The axis of the workpiece centers has been referred to as vertical and the contours on the sheet B have been referred to as horizontal. It will be understood, howeevr, that terms such as "vertical" and "horizontal" are used merely for convenience in describing the relationship of the parts and that they are not to be construed as otherwise limiting the scope of the invention.

Referring to Fig. 1 of the drawings, 10 represents a main base upon which all other parts of the apparatus are mounted. Secured to the base 10 is an upright 12 which provides a guideway for a vertically movable slide 14. A handwheel 16 on the upright 12 is connected with the slide 14 by suitable means such as a pinion and rack, not shown, and rotation of the handwheel serves to vertically move the slide and all parts carried thereby. The slide and the parts thereon are counterbalanced by a suitable weight, not shown, the slide and the weight being connected by a chain 18.

The workpiece A has tapered holes at its ends so as to be adapted for mounting on aligned tapered centers such as 20 and 22 having a vertical axis V. The location of the axis V is shown in Fig. 2 and its relationship with other parts will be later discussed. The lower center 20 is shown in Fig. 2 and the upper center 22 is shown in Fig. 1. The said axis of the center engaging holes in said workpiece, which is also the axis V, is in a definite predetermined relation with the before-mentioned workpiece contours $a$, $b$ and $c$.

Referring to Fig. 2, the lower center 20 is carried by a support 24 which is carried by a bracket 26 secured to the slide 14 near the bottom thereof. Said bracket 26 is connected with the slide by means of bolts entering a vertical T-slot 28. By loosening said bolts the bracket and the parts carried thereby can be vertically adjusted along the slide. Said support 24 is shown as being round and it is preferably rotatable on said bracket about a vertical axis coincident with the axis of said center 20.

Means may be provided for releasably holding said support 24 in any one of a plurality of rotative positions. As shown, a disc 30 is fixedly connected with the support 24 below the bracket 26. Mounted in the bracket 26 at the bottom thereof are two or more spring-pressed ball detents 32, 32 and the upper face of the disc 30 has a notch or groove 34 with which any one of the detents may engage. Preferably there are four detents 32, 32 which are equally spaced. The support 24 may be releasably held in any one of four equally spaced positions.

The upper center 22 is carried by a bracket 36 similar to a tailstock. Said tailstock bracket is connected with the slide 14 by a bolt 38 entering said T-slot 28, the bracket being vertically adjustable by loosening the bolt. The upper center 22 is vertically adjustable on the bracket and may be clamped in adjusted position by a screw having a handle 40.

With the upper center raised, a workpiece A can be put in place and then the upper center can be engaged with the workpiece and clamped. Various elements such as 42 and 43 can be attached to the support 24 for engaging the workpiece to prevent rotation of said workpiece relatively to the support. As before stated, the support 24 can be readily indexed manually to any one of four equally spaced positions, and it therefore follows that the workpiece A can be similarly indexed.

Figs. 3 and 4 show a horizontal table 44 for supporting the reference sheet B, together with various parts directly associated with said table. Said table is preferably round and is preferably rotatable about a vertical axis W.

Carried by a portion of the main base 10 is a stationary vertical mast 45 preferably integral with a pedestal 46. The center of the mast 45 is at said table axis W. The table may be a casting secured to a hub 48 which fits the mast 45 and is rotatable thereon. Preferably a nut 50 is provided which has threaded engagement with the lower portion of the mast 45 and said nut supports an antifriction bearing 52. A ring 54 engages said bearing 52 and the bottom of the hub 48 rests on the ring. Thus the nut supports the table and the level of the top of the table can be adjusted by turning the nut on its threads. Preferably the nut 50 is the hub of a handwheel 55, provision being thus made for conveniently turning the nut to vertically adjust the table.

Located below the table 44 is an indexing member 56 having a hub 58 which surrounds and fits the table hub 48. The member 56 is rotatively adjustable relatively to the table and it may be locked or clamped in its adjusted position. As shown, the hub 58 is provided with a lateral projection 60 and there is a vertical slot 62 that extends from the bottom of the hub and through said projection. A shaft 64 carrying a knob 66 extends through an unthreaded hole in the left portion of the projection 60 and has a threaded end portion that extends into a threaded hole in the right portion of said projection. Said shaft 64 has a shoulder 67 that engages the outer face of said left portion of the projection 60 to prevent movement of said shaft toward the right. By turning said threaded shaft the right portion of said projection 60 can be drawn toward the left portion to clamp the hub 58 to the hub 48 so that the member 56 may be held in any position of rotative adjustment with respect to the table 44.

The member 56 carries a plurality of detent pins 68, one of which is shown in Figs. 3 and 4. Preferably there are four pins at equal distances from the table axis W and equally spaced circumaxially. Secured to the base 10 is a bracket 70 which carries a detent arm 72 pivotally movable on a vertical pin 74. A spring 76 biases the arm 72 for counterclockwise movement, such movement being limited by a screw head 78. The arm 72 has a notch 80 with inclined sides, the notch being adapted to receive any one of the detent pins 68. When a pin 68 is entered in said notch 80, the table 44 is releasably held in one rotative position.

The table 44 can be readily indexed manually to any one of four equally spaced positions. The last said positions of the table may be adjusted or oriented with respect to the base and the workpiece holder by rotatively moving the table relatively to the indexing member 56 in the manner previously described. The table may be adjusted vertically by means of the handwheel 55.

Figs. 5 and 6 show in detail the mechanism for comparing the contour of a workpiece A on the support 24 with a master contour on a sheet B on the table 44. This mechanism includes a slide 82 movable generally toward and from the axis V of the workpiece support 24 and a slide 84 movable generally toward and from the axis W of the table 44, said slides being interconnected for movements in directions perpendicular to each other.

The slides 82 and 84 are on a carrier 86 which is preferably pivoted for movement about a fixed vertical axis X. The axis X is so located that a plane through said axis and the axis V is perpendicular to a plane through said axis X and the axis W. As shown a bracket 88 is secured to the base 10 and this bracket carries a vertical pivot pin 90, the axis of said pin being the before-mentioned vertical axis X. Fitting the pin 90 and pivotally movable thereon is the said slide carrier 86. The slide 82 fits a groove in the top of the carrier 86 so as to be freely movable generally toward and from the axis V. Secured to the slide 82 at the rear end thereof and suitably insulated therefrom is a metallic plate 92 and this plate carries a small partly circular metallic tracer disc 94 having a central axis Y in fixed relation to said slide. When the workpiece support 24 is movable about an axis such as V, the axis Y of the disc 94 may be in the plane connecting the axis V of the workpiece support and the axis X of the slide carrier. However, said disc 94 and the axis Y thereof may have various positions outside of said plane as the several parts of the apparatus are relatively moved. A flexible conductor 96 is connected with the disc 94 for a purpose to be hereinafter described.

The slide 84 is also guided on the slide carrier 86 and it is located immediately above the slide 82. The slide 84 is supported by a roller 98 on the main body of the carrier 86 and by a roller 100 on an extension 101 of said carrier. Said slide 84 is guided at the rear by lugs 102 and 104 on said carrier 86, the guide faces of said lugs being in a plane perpendicular to the direction of movement of the slide 82. The slides 82 and 84 are interconnected in such a manner that the movement of the second slide 84 has the said predetermined ratio to the movement of the first slide 82. As illustrated, the movement of the second slide is 10 times as much as the movement of the first slide.

The means for interconnecting the two slides may be varied, but the presently preferred means will be now described. The front edge 106 of the slide 84 is inclined with respect to the rear edge thereof, the slide being tapered toward the right. Carried by the slide 82 is a shoe 108 which engages the inclined front edge 106 of the slide 84. Means is provided for biasing the slide 82 rearwardly and as shown this means is a cord 110 connected at one end to a screw 111 on the bottom of said slide 82. Said cord extends rearwardly and then around a pulley 112 on the carrier 86. From the pulley the cord 110 extends forwardly and around a spring-biased winding drum 114. The spring for the drum 114 maintains tension in the cord 110 and the cord always holds the slide 82 as far toward the rear as is permitted by the engagement of the shoe 108 with the inclined edge 106 of the slide 84. When the slide 84 is manually moved, the slide 82 has a smaller but proportionate movement, the said movements having said predetermined ratio.

Secured to the slide 84 at the left end thereof is a circular reference disc 115, this disc being carried by an arm 116 rigidly secured to the slide 84. When the table 44 for the reference sheet is movable about an axis such as W, the axis Z of the disc 115 may be in the plane connecting the axis W of the table and the axis X of the slide carrier. However, said axis Z may have various positions outside of said plane as the several parts of the apparatus are relatively moved. When the axis Y of the disc 94 is in the plane through the axes V and X as shown in Fig. 5, the axis Z of the disc 115 is in the plane through the axis W and X as also shown in Fig. 5. Preferably the arm 116 carries a knob 118 for conveniently moving the slide 84 and other parts.

The apparatus is designed for a predetermined size ratio between the lines of the master drawing B and the workpiece A to be inspected, and for the apparatus as shown this ratio is 10 to 1. For the said ratio of 10 to 1, the edge 106 of the slide 84 is so inclined that the movements of the slide 84 are 10 times as great as the movements of the slide 82; the radius of the disc 115 for engaging the drawing B is 10 times as great as the radius of the disc 94 associated with the workpiece A; the distance from the axis X to the axis W is 10 times as great as the distance from the axis X to the axis V; and the distance from the axis X to the axis Z is 10 times as great as the distance from the axis X to the axis Y.

During inspection the slides 84 and 82 are moved, by means of the knob 118 or otherwise, so that the disc 94 follows the contour of the workpiece A, or alternatively so that the disc 94 is moved into close proximity with the contour of the workpiece at various positions therealong. Inasmuch as the workpiece is normally fixed, the movement of the tracer disc 94 to various positions along the contour of said workpiece ordinarily requires movements of the slide carrier 86 and of the slides 82 and 84 about the vertical axis X. As hereinafter more fully explained, the movement of the tracer disc 94 to various positions along the workpiece contour results in the movement of the reference disc 115 to similar positions along a master contour on the table 44.

Preferably for maximum accuracy and for the avoidance of wear, provision is made for approximate engagement of the tracer disc 94 with the workpiece without any actual contact therewith. The workpiece support 24 and the workpiece A are electrically grounded, and by means of the conductor 96 the disc 94 is maintained at a substantially higher potential so that a spark gap may be maintained between the disc and the workpiece when they are in very close proximity. The conductor 96 is connected in an electric circuit which is not fully shown but which includes an ammeter 120 in an instrument box 122 carried by the main upright 12. When the gap between the disc 94 and the workpiece is sufficiently small to provide a spark, the ammeter reading varies directly and very sensitively with the length of said spark gap and by adjusting the disc 94 to provide a predetermined ammeter reading the spark gap will have an exactly predetermined length, that is, the disc will be an exactly predetermined distance from the workpiece. This distance will ordinarily be on the order of .0005".

It has been stated that, for the example given, the radius of the disc 115 is 10 times the radius of the disc 94. For extreme accuracy the effective radius of the disc 94 should be regarded as being the actual radius thereof plus the length of the spark gap, which may be .0005". The radius of the disc 115 should be 10 times said effective radius of the disc 94.

The electrical circuit for forming and maintaining the spark may be somewhat similar to that which is shown in Fig. 25 of said Patent No. 2,677,310, more particularly the upper left portion thereof, and which is described in the specification of said patent.

When the tracer disc 94 is moved to follow the contour of the workpiece or is moved to different positions along said contour, the described construction and arrangement of parts will cause the disc 115 to have a relationship to the contour on the sheet B which last said contour is exactly the same as the contour of the workpiece except that it is 10 times as large. Preferably the sheet B is provided with at least one master line as described which represents a correct or standard contour for the workpiece. If the disc 115 exactly follows or conforms to the master line of the sheet B, the contour of the workpiece is shown to be correct, but if the disc 115 does not exactly follow or conform to the master line of the sheet B all deviations of said disc from said master line represent inaccuracies or errors in the workpiece contour, the positions and extents of the deviations of the disc 115 indicating the positions and extents of the errors in the workpiece contour.

In practice, the disc 94 is moved into the proper relationship with a selected point on the workpiece contour to result in the predetermined reading on the ammeter 120. Then the inspector observes the position of the reference disc 115 with relation to the corresponding master contour. If the disc 115 is tangent to the master contour, the contour of the workpiece is correct at the selected point, but if the disc 115 overlaps or is spaced from the master contour the contour of the workpiece is incorrect at said selected point. It has been found that a skilled and experienced inspector can visually determine with sufficient accuracy the extent of the variation of the reference disc 115 from the master contour and can thus determine whether the variations in the workpiece contour are within prescribed limits.

In setting up the apparatus for inspecting any particular workpiece or a series of similar workpieces, it is necessary for the contour of the workpiece and the contour of the master line on the sheet B, such as b', to be equivalently oriented. The two contours must have exactly the same relationships to the respective axes V and W and the said contours must have exactly the same rotative relationship or orientation with respect to the fixed parts of the machine. The proper rotative relationship or orientation may be attained by loosening the table and rotatively adjusting it relatively to the indexing member 56.

When the entire periphery of a shape, such as that of a turbine blade, must be inspected, it is necessary to rotatively shift the workpiece to expose successive portions of its periphery to the tracer disc 94. To maintain orientation between the workpiece and the contour on the sheet B, it is necessary to also rotatively shift said sheet B to expose successive portions of the contour thereon to the reference disc 115. Therefore, means is provided for holding the workpiece support 24 in any one of a plurality of rotatively different positions and means is provided for holding the table 44 in any one of a plurality of predetermined rotatively different positions, said different positions of the table having the same relationship to each other as the relationship to each other of the different positions of the support.

Described more specifically, the support 24 may be moved through a quarter turn so that the next ball detent 32 enters the groove 34. When the support 24 is so shifted, the table 44 is similarly shifted through a quarter turn in the same direction so that the next detent pin 68 engages the detent arm 72. Thus the identity of rotative orientation is maintained.

Fig. 1 shows the intermediate zone b of the workpiece at the level of the tracer disc 94, that is, at the operative level. However, in making an inspection the ordinary practice would be to start with the workpiece at a lower or higher level for the inspection of the zone at one end. If the workpiece is initially at a lower level, the contour at zone a is compared with the master line or contour a'. Then by means of the handwheel 16 the slide 14 and the workpiece support and the workpiece are successively raised to said operative level so that the contours at zones b and c are compared respectively with the master lines or contours b' and c'.

As previously pointed out, a workpiece such as a turbine blade may have a twist and it is necessary to check its shapes at different zones and also to check the angular relationship of the said shapes at different zones. For purposes of explanation it is assumed that it is sufficient to inspect the workpiece at three levels or zones, but the invention is not so limited. The master lines a', b' and c' on the sheet B represent the correct contours of the workpiece at three different levels or zones a, b and c, and the angular relationship of said master lines a', b' and c' represent the correct angular relationship of the workpiece contours at said zones a, b and c.

As thus far described, it has been assumed that sheet B is a relatively thin sheet of paper. However, the master lines such as a', b' and c' may be drawn on a different material such as metal or glass. For a thicker material it is necessary, or at least desirable to lower the table so that the top surface of the thicker sheet is at a predetermined level. This vertical adjustment of the table may be readily effected by the handwheel 50.

The invention claimed is:

1. In an apparatus for comparing the contour of a workpiece at a selected plane thereof with a master contour to determine deviations of said workpiece contour from a standard contour therefor at said plane, the combination of a support for holding said workpiece in a normally fixed position with its said plane horizontal, a horizontal table normally held in a fixed position and adapted for holding a reference sheet having said master contour thereon which master contour is larger than said standard workpiece contour and has a size bearing a predetermined ratio to the size of said standard contour, a slide carrier movable about a fixed vertical axis, a first slide guided for rectilinear movement relatively to the carrier and generally toward and from said support which slide has a shoe thereon, means for biasing said slide for movement in one direction relatively to said carrier, a second slide guided for rectilinear movement relatively to the carrier and perpendicularly to the movement of the first slide and generally toward and from said table which second slide has an edge face engaged by the shoe on the first slide as the result of the biasing of said first slide by said biasing means, said edge face being inclined with respect to the direction of movement of said second slide and being so inclined to such an extent that any movement of the second slide relatively to the carrier bears said predetermined ratio to the extent of movement of the first slide relatively to the carrier, a tracer disc having its axis vertical and in fixed relationship to said first slide which disc is movable with said slide and into predetermined close relationship with a workpiece on said support, and a reference disc having its axis vertical and in fixed relationship to said second slide which disc is movable with said second slide and into close relationship with said master contour on said table and which disc has a radius bearing said predetermined ratio to the radius of said tracer disc.

2. In an apparatus for comparing the contour of a workpiece at a selected plane thereof with a master contour to determine deviations of said workpiece contour from a standard contour therefor at said plane, the combination of a support movable about a fixed vertical axis and adapted for holding said workpiece with its said plane horizontal, a horizontal table movable about a fixed vertical axis and adapted for holding a reference sheet having said master contour thereon which master contour is larger than said standard workpiece contour and has a size bearing a predetermined ratio to size of said standard contour, a slide carrier movable about a fixed vertical axis, a first slide guided for rectilinear movement relatively to the carrier, a tracer disc having its axis vertical and in fixed relationship to said slide which disc is movable with said slide and into predetermined close relationship with a workpiece on said support, the said slide and the said disc being adjustable with the slide carrier about the pivotal axis of the latter so that the disc axis is movable in a plane which extends through the carrier axis and through the support axis, a second slide guided for rectilinear movement relatively to the carrier and perpendicularly to the relative movement of the first slide and generally toward and from said table, means interconnecting said slides so that the movement of said second slide bears said predetermined ratio to the movement of the first slide, and a reference disc having its axis vertical and in fixed relationship to said second slide which disc is movable with said second slide into close relationship with said master contour on said table, said reference disc having a radius bearing said predetermined ratio to the radius of said tracer disc and said reference disc being so related to the second slide that its axis is movable in a plane which extends through the carrier axis and through the table axis when the tracer disc axis is movable in said plane which extends through the carrier axis and through the support axis.

3. An apparatus as set forth in claim 2, wherein the distance between the table axis and the carrier axis bears said predetermined ratio to the distance between the support axis and the carrier axis.

4. In an apparatus for comparing the contour of a work piece at a selected plane thereof with a master contour to determine deviations of said workpiece contour from a standard contour therefor at said plane, the combination of a support movable about a fixed vertical axis and adapted for holding said workpiece with its said plane horizontal, a horizontal table movable about a fixed vertical axis and adapted for holding a reference sheet having said master contour thereon which master contour is larger than said standard workpiece contour and has a size bearing a predetermined ratio to size of said standard contour, a slide carrier movable about a fixed vertical axis, a first slide guided for rectilinear movement relatively to the carrier, a tracer disc having its axis vertical and in fixed relationship to said slide which disc is movable with said slide and into predetermined close relationship with a workpiece on said support, the said slide and the said disc being capable of movement such that the disc axis moves in a plane which extends through the carrier axis and through the support axis, a second slide guided for rectilinear movement relatively to the carrier and perpendicularly to the relative movement of the first slide and generally toward and from said table, means interconnecting said slides so that the movement of said second slide bears said predetermined ratio to the movement of the first slide, a reference disc having its axis vertical and in fixed relationship to said second slide which disc is movable with said second slide into close relationship with said master contour on said table, said reference disc having a radius bearing said predetermined ratio to the radius of said tracer disc and said reference disc being so related to the second slide that its axis is movable in a plane which extends through the carrier axis and through the table axis when the tracer disc axis is movable in said plane which extends through the carrier axis and through the support axis, means for holding said workpiece support in any one of a plurality of predetermined rotatively different positions, and means for holding said table in any one of a plurality of predetermined rotatively different positions, said different positions of the table having the same relationship to each other as the relationship to each other of the different positions of the support.

5. An apparatus as set forth in claim 4, wherein said means for holding the table in any one of a plurality of positions includes an indexing member releasably connected with the table for rotative movement in unison therewith about said table axis and also includes detent elements for releasably holding said indexing member in any one of said plurality of rotative positions, and wherein means is provided for holding said table in any position of rotative adjustment relatively to said indexing member so that the master contour on the table may be oriented with respect to the contour of a workpiece on the support.

6. In an apparatus for comparing the contours of a workpiece at a plurality of parallel selected planes thereof with a corresponding plurality of standard contours for said work piece at said planes, the combination of a vertically movable bracket, a support on said bracket movable about a fixed vertical axis and adapted for holding said workpiece, means for moving said slide and support vertically and for holding them in any selected position so that the workpiece may be held with any one of said selected planes to an operative level, a horizontal table movable about a fixed vertical axis and adapted for holding a reference sheet having said plurality of master contours thereon which master contours are larger than said standard workpiece contours and have sizes bearing a predetermined ratio to the sizes of said standard contours, a slide carrier movable about a fixed vertical axis, a first slide guided for rectilinear movement relatively to the carrier and generally toward and from said support, a tracer disc at said operative level and having its axis vertical and in fixed relationship to said first slide which disc is movable with said slide and into predetermined close relationship with a workpiece on said support, the said first slide and the said disc being adjustable with the slide carrier about the pivotal axis of the latter so that the disc axis is movable in a plane which extends through the carrier axis and through the support axis, a second slide guided for rectilinear movement relatively to the carrier and perpendicularly to the movement of the first slide and generally toward and from said table, means interconnecting said slides so that the movement of said second slide bears said predetermined ratio to the movement of the first slide, a reference disc having its axis vertical and in fixed relationship to said second slide which disc is movable with said second slide and into close relationship with any one of said master contours on said table and which disc has a radius bearing said predetermined ratio to the radius of said tracer disc, said reference disc being so related to the second slide that its axis is movable in a plane which extends through the carrier axis and through the table axis when the tracer disc axis is movable in said plane which extends through the carrier axis and through the support axis, means for holding said workpiece support in any one of a plurality of predetermined rotatively different positions with respect to said bracket, and means for holding said table in any one of a plurality of predetermined rotatively different positions, said different positions of the table having the same relationship to each other as the relationship to each other of the different positions of the support.

References Cited in the file of this patent

UNITED STATES PATENTS

| | | |
|---|---|---|
| 292,927 | Lipe | Feb. 5, 1884 |
| 420,278 | Miller | Jan. 28, 1890 |
| 1,939,266 | Kearney | Dec. 12, 1933 |
| 2,342,539 | Gorton | Feb. 22, 1944 |
| 2,372,470 | Bergstrom | Mar. 27, 1945 |
| 2,488,088 | Marchant | Nov. 15, 1949 |
| 2,542,755 | Dietrich | Feb. 20, 1951 |
| 2,553,026 | Williams | May 15, 1951 |
| 2,610,404 | Compton | Sept. 16, 1952 |
| 2,640,272 | Bean | June 2, 1953 |
| 2,648,912 | Osgood | Aug. 18, 1953 |
| 2,672,690 | Crook | Mar. 23, 1954 |
| 2,677,310 | Campbell | May 4, 1954 |
| 2,714,254 | Andrews | Aug. 2, 1955 |

FOREIGN PATENTS

| | | |
|---|---|---|
| 1,141 | Great Britain | 1893 |